United States Patent [19]

Oka et al.

[11] 4,315,396

[45] Feb. 16, 1982

[54] SHIELD AND DEFLECTOR MEANS FOR ORCHARD IMPLEMENT

[75] Inventors: Ken K. Oka, St. Catharines; John Kulak, Port Colborne, both of Canada

[73] Assignee: Deere & Company, Moline, Ill.

[21] Appl. No.: 171,590

[22] Filed: Jul. 23, 1980

[51] Int. Cl.³ ............................................. A01D 67/00
[52] U.S. Cl. ............................ 56/320.1; 56/DIG. 20; 56/17.2; 280/152 R
[58] Field of Search ..................... 56/320, 320.1, 320.2, 56/13.6, DIG. 13, DIG. 20, 17.4; 280/152 R, 153 R, 153 B

[56] References Cited

U.S. PATENT DOCUMENTS

| | | | |
|---|---|---|---|
| 2,891,370 | 6/1959 | Musgrave | 56/13.6 |
| 3,103,090 | 9/1963 | Campbell | 56/13.6 |
| 3,436,901 | 4/1969 | Gehman et al. | 56/13.6 |
| 3,736,735 | 6/1973 | Kulak et al. | 56/13.6 |
| 3,855,763 | 12/1974 | Seifert et al. | 56/320.2 |

*Primary Examiner*—Robert A. Hafer
*Attorney, Agent, or Firm*—Henderson & Sturm

[57] ABSTRACT

An agricultural implement for operation over the ground beneath the low-hanging branches of trees in an orchard is equipped with shield means effective to prevent or minimize injury to the branches and fruit borne thereby. The inventive feature is the provision of a wheel support and ground-engaging wheel capable of adjustment relative to the main body of the implement, together with a fender carried by the wheel support independently of the main body and a shield member carried by the body and overlying the fender so as to cover the gap between the fender and body irrespective of adjustment of the wheel, wheel support and fender.

7 Claims, 4 Drawing Figures

U.S. Patent  Feb. 16, 1982  4,315,396
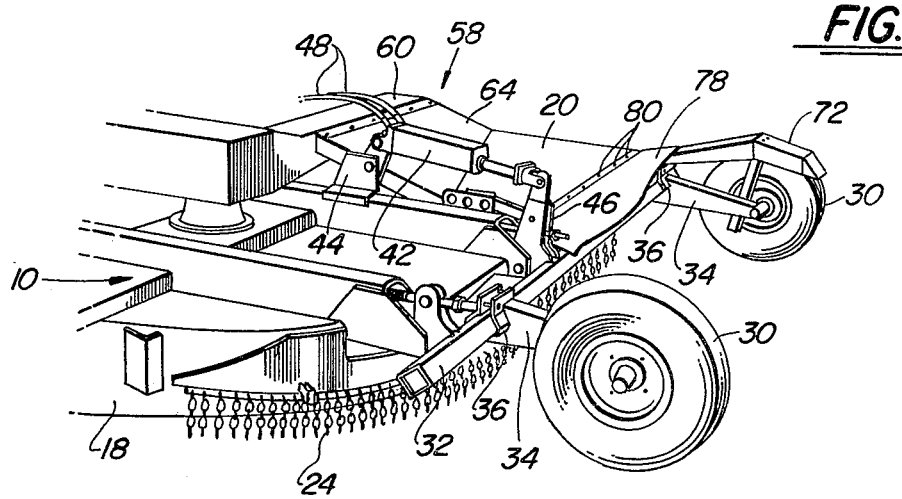
FIG. 1
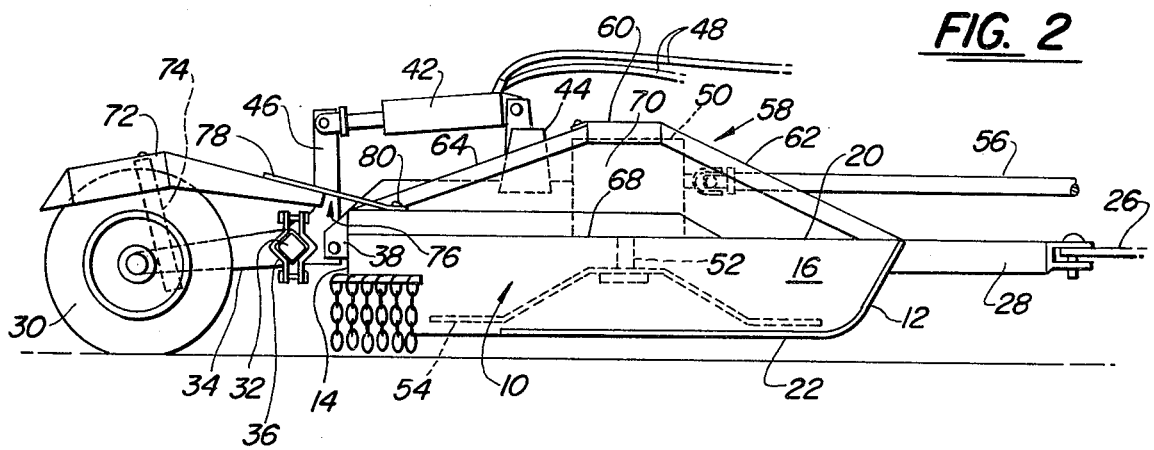
FIG. 2
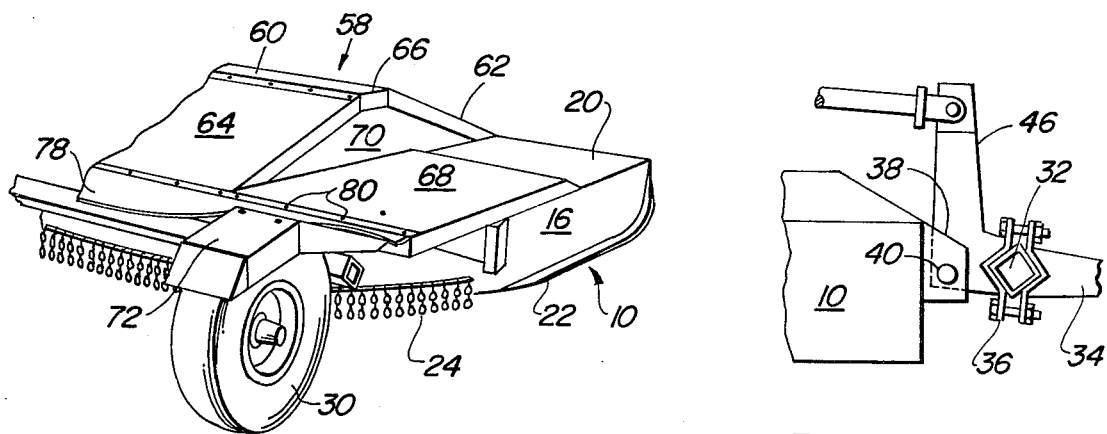
FIG. 3
FIG. 4

SHIELD AND DEFLECTOR MEANS FOR ORCHARD IMPLEMENT

SUMMARY OF THE INVENTION

A typical implement for operating in orchards as referred to above is a mower of the rotary type, supported at its front end and drawn by a farm tractor and carried at its rear end by one or more wheel means. The rotary blades of the mower lie beneath the main body and are powered from the tractor power take-off by means of a drive shaft extending to and driving gearing within a drive casing mounted on the top of the deck. It has been recognized heretofore that the casing and drive shaft present obstructions to the free passage of low-hanging branches over the mower as it advances through the orchard and various forms of shielding have been devised to enclose or at least partly enclose the casing to eliminate this problem. It is also known that the shield means must be of fore-and-aft sloping nature so as to guide the branches gently over the shielding and to gently release the branches as the mower passes beyond the branches so as to avoid sudden release of the branches and thereby to avoid shaking the fruit from the branches.

It is also known to provide fenders over the rear wheels as part of the shielding, or to extend the basic shield sufficiently far rearwardly to cover at least the tops of the wheels. Such arrangement seems to suffice so long as the wheels and the supports therefor do not require adjustment relative to the body, because when the wheel supports are fixed there is no variation, such as gaps, etc., between the wheels and body and fixed shielding appears to be adequate.

According to the present invention, the wheel support is capable of either or both vertical and lateral adjustment and the problem presented is one of accommodation of the variable gap that occurs between the body and wheel as the adjustments are made. The solution is mounting the fender for the wheel on the adjacent wheel support, whereby it becomes adjustable along with the wheel support and wheel, and associated with the basic shield means is an auxiliary shield carried by the body and extending rearwardly in overlying relation to the fender. The shield is flexible to accommodate vertical adjustment of the wheel and is elongated laterally of the body so as to ensure bridging the gap irrespective of lateral positioning of the wheel.

Another feature of the invention is the termination of the body-overlying shield means at a location leaving a substantial portion of the top of the body flat. In the type of implement and operation discussed herein, primary concern is with the right-hand side of the mower, because the mower is normally operated with the right side of the mower toward the tree trunk and under the branches. In one prior machine, the top shield means is extended clear across to the right-hand side of the mower body, creating unnecessary uphill and downhill movement of low-hanging branches. According to the invention, this unnecessary up and down movement is eliminated and the branches, if not too low, will pass straight back over the flat top and, if extra long, will simply slide over the flat top without interference from the shield means.

BRIEF DESCRIPTION OF THE DRAWINGS

FIG. 1 is a fragmentary perspective of the implement as seen from the left, rear corner.

FIG. 2 is an elevation as seen from the right side of the implement.

FIG. 3 is a fragmentary perspective as seen from the right, rear corner.

FIG. 4 is a fragmentary view of the manner of mounting the wheel support shaft on the implement body.

DESCRIPTION OF THE PREFERRED EMBODIMENT

The implement or machine chosen for the purposes of the present disclosure is typical of known rotary mowers, having a main body 10 including front and rear ends 12 and 14 respectively and right and left sides 16 and 18 respectively. The body is in the form of a deck having a substantially flat top 20 and depending skirt portions 22 at its front and sides. A flexible curtain 24 depends from the rear of the body, usually consisting of depending chains or the like capable of allowing the normal exit of cut material but effective to decelerate foreign objects thrown out the rear during the mowing operation. This is a detail familiar to those versed in the art and forms no part of the present invention.

The front end of the body is supported on a tractor drawbar 26 by means of a draft tongue or hitch 28. The rear of the body is carried by a pair of ground-engaging wheels 30 (FIG. 1) by means of supporting structure including a cross shaft 32 and a pair of trailing wheel supports or arms 34. The wheels are journaled respectively at the rear ends of the arms and each arm is affixed to the cross shaft by clamp means 36 which enable the wheel supports and wheels to be adjusted laterally of the line of travel of the mower. The cross shaft length is substantially coextensive with the width of the body 10, thus allowing a wide latitude of wheel positions. As best seen in FIG. 4, the body has rearwardly extending brackets 38 which provide a transverse, horizontal pivot 40 enabling rocking of the shaft, together with its wheels and wheel supports, relative to the main body, which allows for adjustment of the height of the body above the ground. Rocking of the shaft is typically accomplished by means of a hydraulic cylinder and piston unit 42 connected between an upstanding support 44 on the body and an arm 46 fixed to the shaft 32. The hydraulic unit is selectively extended and retracted by valve means (not shown) on the tractor which controls the supply and return of hydraulic fluid through lines 48, all of which is conventional and which need not be elaborated here.

Carried by and rising from the top of the main body, substantially midway between the right and left sides of the body, is a gear casing 50 which contains typical gearing (not shown) for driving a vertical shaft 52 to the lower end of which is affixed a mower blade 54 of usual construction. The gearing in the casing is driven by a drive shaft 56 which is connected in typical fashion to the tractor power take-off shaft (not shown).

As previously described, concern for shielding arises mainly at the right-hand side and top of the body 10, and for this purpose the top of the body carries fixed thereto shield means 58 covering the gear casing and having a top central part 60, a front part 62 sloping downhill to the front end of the body and a rear part 64 that slopes downhill toward the rear of the body. Thus, low-hanging branches are guided gently up over the body and gear casing and then downwardly at the rear of the body as the mower passes beneath the tree. The shield means in the present case is terminated in its rightward extent just at or slightly beyond the right side of the gear casing, as at 66 (FIG. 3), leaving a substantial area of the top of the body flat, as at 68. A wall 70 rises from the body top to the junction or terminus 68 and encloses the gear casing from the right side thereof. By leaving the large-area flat top portion at 68, the branches are spared unnecessary up and down movement as the machine passes beneath them.

Reference will now be had to additional shield means for guiding branches and fruit over the right-hand rear wheel 30. Part of this shield means is in the form of wheel fender 72 carried by the right-hand wheel support 34 independently of the body, as by a standard 74 affixed by suitable means to the wheel support (see FIGS. 1 and 2). Thus, when the wheel is adjusted laterally or vertically, the fender moves with the wheel and wheel support as part thereof. In this type of design, the front edge of the fender is spaced slightly rearwardly of the rear end of the body, leaving a gap 76 (FIG. 2), the nature of which is dictated by the amount of arcuate movement of the front edge of the fender as it is adjusted up or down with the wheel support. A further part of the additional or auxiliary shield structure resides in shield means 78 in the form of an elongated strip of flexible material, such as fabric-reinforced rubber or the like, suitable for the purpose. The elongation of the strip is in the direction of the width of the body 10 so as to cover or bridge the gap 76 during all phases of lateral positioning or adjustment of the wheel and fender, the strip being affixed to the body as by a series of fasteners 80 and extending rearwardly to overlie and rest atop the fender. The dimension of the strip in a fore-and-aft direction is sufficient to assure that it cannot escape contact with the fender irrespective of the amount of vertical adjustment of the fender and wheel relative to the main body. Since the strip is flexible it may flex during these vertical adjustments and, where no resting on the fender, may slope downwardly and rearwardly (FIG. 1) as a downhill continuation of the top of the body, thus adding to the ease with which branches and fruit are released as the mower advances. Fastening of the strip solely to the body and not also to the fender eliminates upward buckling of the strip which would interfere with the passage of branches and fruit.

It will be seen from the foregoing that the invention possesses many features and advantages. These and others that will become apparent to those versed in the art may be realized from the preferred embodiment disclosed as well as from modifications thereof that do not depart from the spirit and scope of the invention.

I claim:

1. A tractor-drawn and -powered orchard implement having a main body including front and rear ends and opposite sides, a wheel support carried by and extending rearwardly from the rear end of the body, a ground-engaging wheel carried by the wheel support in such manner that a gap exists between the rear end of the body and the front portion of the periphery of the wheel, and a fender overlying the top portion of the wheel, charactizerized in that the wheel support, together with the wheel, is adjustable relative to the body, the fender is carried by the wheel support so as to be adjustable with the wheel and wheel support, and shield means is carried by the body and extends rearwardly in overlapping relation with the fender so as to bridge the aforesaid gap irrespective of adjustment of the wheel, wheel support and fender.

2. The implement of claim 1, further characterized in that wheel, wheel support and fender are adjustable vertically relative to the body and the shield means is flexible so as to accommodate the vertical adjustment.

3. The implement of claim 1, further characterized in that the wheel, wheel support and fender are adjustable laterally relative to the body and the shield means is elongated in a lateral direction so as to accommodate such lateral adjustment.

4. The implement of claim 1, further characterized in that the wheel, wheel support and fender are adjustable both vertically and laterally relative to the body and the shield means is elongated in a lateral direction so as to accommodate such lateral adjustment, said shield means being also flexible so as to accommodate the vertical adjustment.

5. Th implement of claim 1, in which the shield means is carried by the body independently of the fender and rests on the fender.

6. A tractor-drawn and -powered orchard implement having a main body including front and rear ends, opposite right and left sides and a top, a drivable part carried by and below the top, a drive casing carried by and rising from the top substantially midway between the right and left sides of the body, and shield means including an upper part overlying the drive casing and a forward part sloping downwardly and forwardly from the upper part to the front end of the body so as to guide low-hanging branches over the body and casing, characterized in that the lateral extent of the shield means from left to right is such that the shield means terminates rightwardly substantially at the rightward portion of the casing, and the top of the body rightwardly of the shield means presents a flat portion of substantial area below the level of the shield means upper part and extends substantially uninterruptedly from front to rear of the body.

7. The implement of claim 6, further characterized in that the shield means includes a substantially upright wall extending between said flat portion and said upper part at the right side of the casing so as to complete the enclosure of the casing by the shield means.

* * * * *